United States Patent
Choi

(10) Patent No.: US 6,226,052 B1
(45) Date of Patent: May 1, 2001

(54) APPARATUS TO ADJUST THE AMOUNT OF OVER-SCANNING OF A DISPLAYED VIDEO IMAGE AND METHOD FOR CONTROLLING SUCH APPARATUS

(75) Inventor: Hae Young Choi, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/003,691

(22) Filed: Jan. 7, 1998

(30) Foreign Application Priority Data

Jan. 10, 1997 (KR) .................................................... 97-463

(51) Int. Cl.$^7$ ...................................................... H04N 7/01
(52) U.S. Cl. ........................ 348/704; 348/581; 348/561; 348/441; 348/552
(58) Field of Search .................................... 348/704, 722, 348/580, 581, 561, 552, 441, 445, 606, 607; H04N 7/01

(56) References Cited

U.S. PATENT DOCUMENTS

| | | | |
|---|---|---|---|
| 4,729,012 | * | 3/1988 | Jose et al. .............................. 358/11 |
| 5,048,104 | * | 9/1991 | D'Aoust et al. ....................... 382/46 |
| 5,218,436 | * | 6/1993 | Sugiyama et al. ................... 358/141 |
| 5,249,049 | * | 9/1993 | Kranawetter et al. ............... 358/141 |
| 5,303,044 | * | 4/1994 | Richards .............................. 348/445 |
| 5,309,234 | * | 5/1994 | Kranawetter et al. ............... 348/473 |
| 5,323,235 | * | 6/1994 | Tonomura et al. ................... 348/445 |
| 5,502,511 | * | 3/1996 | Nagel ................................... 348/704 |
| 5,534,934 | * | 7/1996 | Katsumata et al. .................. 348/445 |
| 5,642,167 | * | 6/1997 | Wallace et al. ...................... 348/420 |
| 5,673,086 | * | 9/1997 | Fukuoka et al. ..................... 348/445 |
| 5,751,370 | * | 5/1998 | Lee ....................................... 348/556 |
| 5,781,241 | * | 7/1998 | Donovan .............................. 348/441 |
| 5,835,160 | * | 11/1998 | chen et al. ........................... 348/581 |
| 5,949,923 | * | 9/1999 | Ikeda ................................... 382/298 |
| 5,953,075 | * | 9/1999 | Nagata et al. ....................... 348/581 |

* cited by examiner

Primary Examiner—Reinhard Eisenzopf
Assistant Examiner—Jean W. Désir
(74) Attorney, Agent, or Firm—Sughrue, Mion, Zinn, Macpeak & Seas, PLLC

(57) ABSTRACT

An over-scanning amount for display of video images is adjusted by varying the amount of signal information by inserting or deleting pixels at spatio-periodic intervals along the horizontal scan. A judgement is made to determine if the over-scanning amount needs to be increased or decreased. If the over-scanning amount is to be decreased, pixels are deleted. If the over-scanning amount is to be increased, pixels are inserted. When pixels are inserted, the signal information for each inserted pixel may be a duplicate of the information for the pixel to the immediate left or right, or it may be an average of the information in those immediately adjacent pixels.

5 Claims, 5 Drawing Sheets

APPARATUS TO ADJUST THE AMOUNT OF OVER-SCANNING OF A DISPLAYED VIDEO IMAGE AND METHOD FOR CONTROLLING SUCH APPARATUS

BACKGROUND OF THE INVENTION

1. Field of the Invention

The present invention relates to an apparatus to adjust the over-scanning amount of a video scan and a method of controlling the apparatus. In the present invention, over-scanning is adjusted by varying the amount of signal information.

2. Description of the Prior Art

Generally, the actual horizontal size of the video signals which are to be displayed on a screen is larger than the effective size of the picture which is watched by users.

The difference between the horizontal width of the actual video signals and the effective size of the picture is called "over-scanning amount".

The percentage of the over-scanning amount is called "over-scanning rate". When a user selects an over-scanning adjustment function, the over-scanning can be adjusted if a microcomputer judges that the over-scanning rate is too small or too large.

Conventionally, the over-scanning is adjusted by adjusting the magnitude of the horizontal deflections.

FIG. 1 illustrates the conventional over-scanning adjusting method. The relationship of the over-scanning amount to the deflections will be described referring to FIG. 1. If it is assumed that the size of the effective watchable picture is c, and that the magnitude of the horizontal deflection is A, then the over-scanning amount is a–c. If the magnitude of the horizontal deflection is B, then the over-scanning amount is b–c. That is, if the horizontal deflection is increased from A to B, then the over-scanning amount increases as much as b–a.

If the over-scanning amount is too large, then the magnitude of the horizontal deflection is reduced to decrease the over-scanning amount. On the other hand, if the over-scanning amount is too small, then the magnitude of the horizontal deflection is increased to increase the over-scanning amount. In this way, the over-scanning is adjusted.

In this conventional over-scanning amount adjusting method, however, when the deflection is varied, not only is the picture size varied but the brightness and the contrast are also varied. Such unintended changes in the brightness and contrast of the picture cause the viewer to have eye fatigue.

SUMMARY OF THE INVENTION

The present invention is intended to overcome the above described disadvantage of the conventional technique.

Therefore it is an object of the present invention to provide an apparatus to adjust over-scanning amount and a method of controlling the apparatus, in which only the picture size is varied by varying the amount of the signal information, with the brightness and the contrast being left intact.

In achieving the above object, the present invention is characterized as follows. That is, the over-scanning amount can be increased by inserting a pixel of signal information at a regular interval of pixels, and the over-scanning amount can be decreased by deleting a pixel of signal information at a regular interval of pixels.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
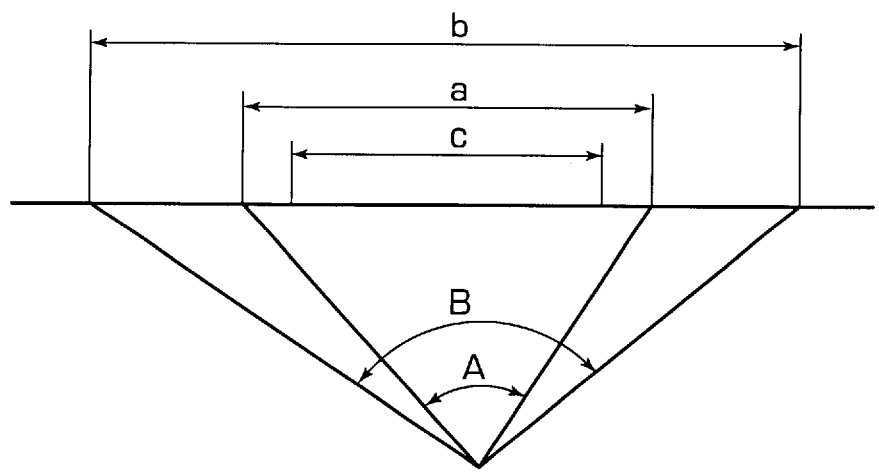
FIG. 1 illustrates the conventional over-scanning adjusting method.
Figure 2:
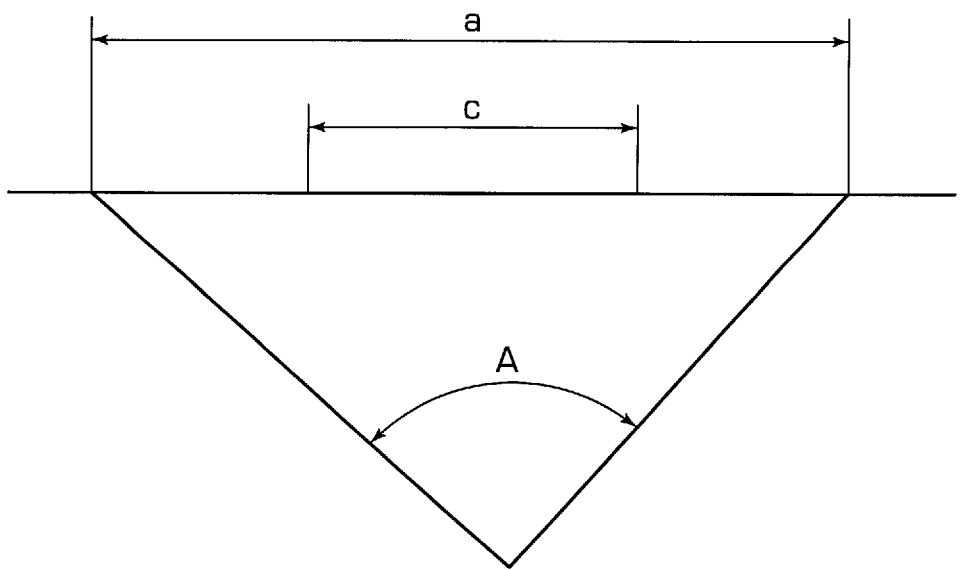
FIG. 2 illustrates a method for adjusting the over-scanning amount by adjusting the amount of the signal information according to the present invention.

FIG. 2 illustrates a method for adjusting the over-scanning amount by adjusting the amount of the signal information according to the present invention. An over-scanning amount is increased or decreased from a–c by adding or deleting a signal information, while the horizontal deflection is fixed to A.

Figure 3:
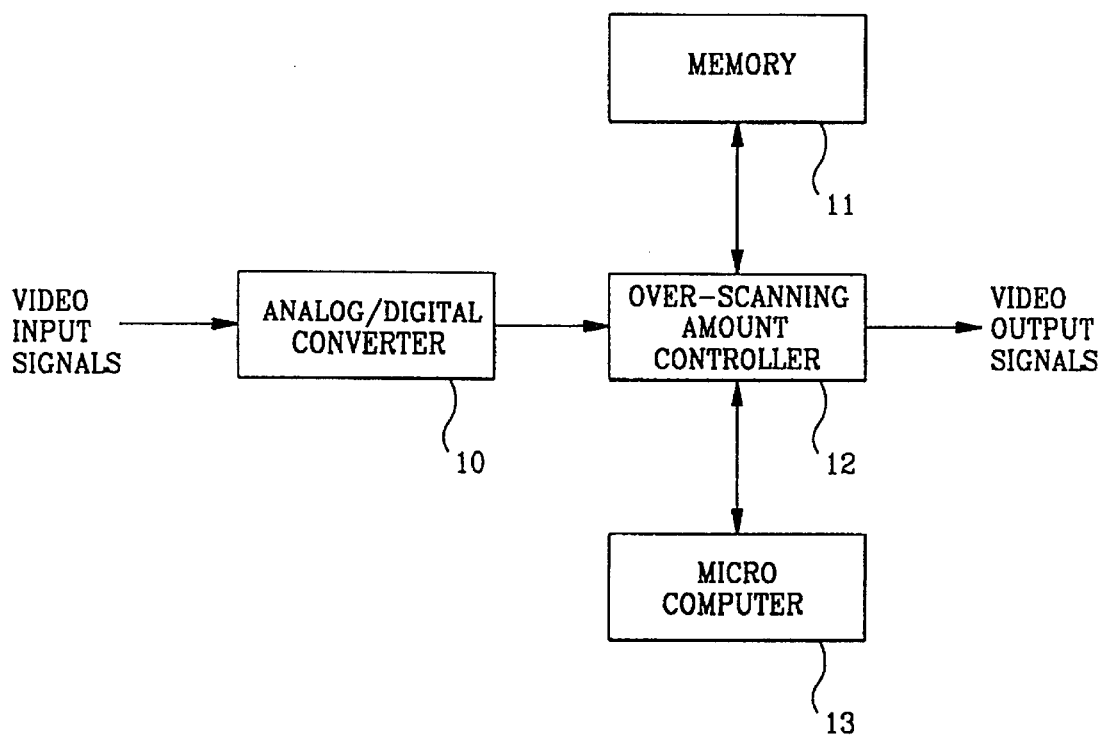
FIG. 3 is a block diagram showing the constitution of the over-scanning amount adjusting apparatus according to the present invention.

FIG. 3 is a block diagram showing the constitution of the over-scanning amount adjusting apparatus according to the present invention. The apparatus for adjusting an over-scanning amount according to the present invention includes an analog/digital converter 10 for converting continuous analog video input signals into digital signals, as well as a memory 11 for storing the output digital signals of the analog/digital converter 10. The apparatus also has an over-scanning controller 12 for inserting and deleting pixels of signal information into and from a signal information stored in the memory 11 and a microcomputer 13 for carrying out controls to make the over-scanning controller 12 insert or delete the pixels of signal information.

Figure 4:
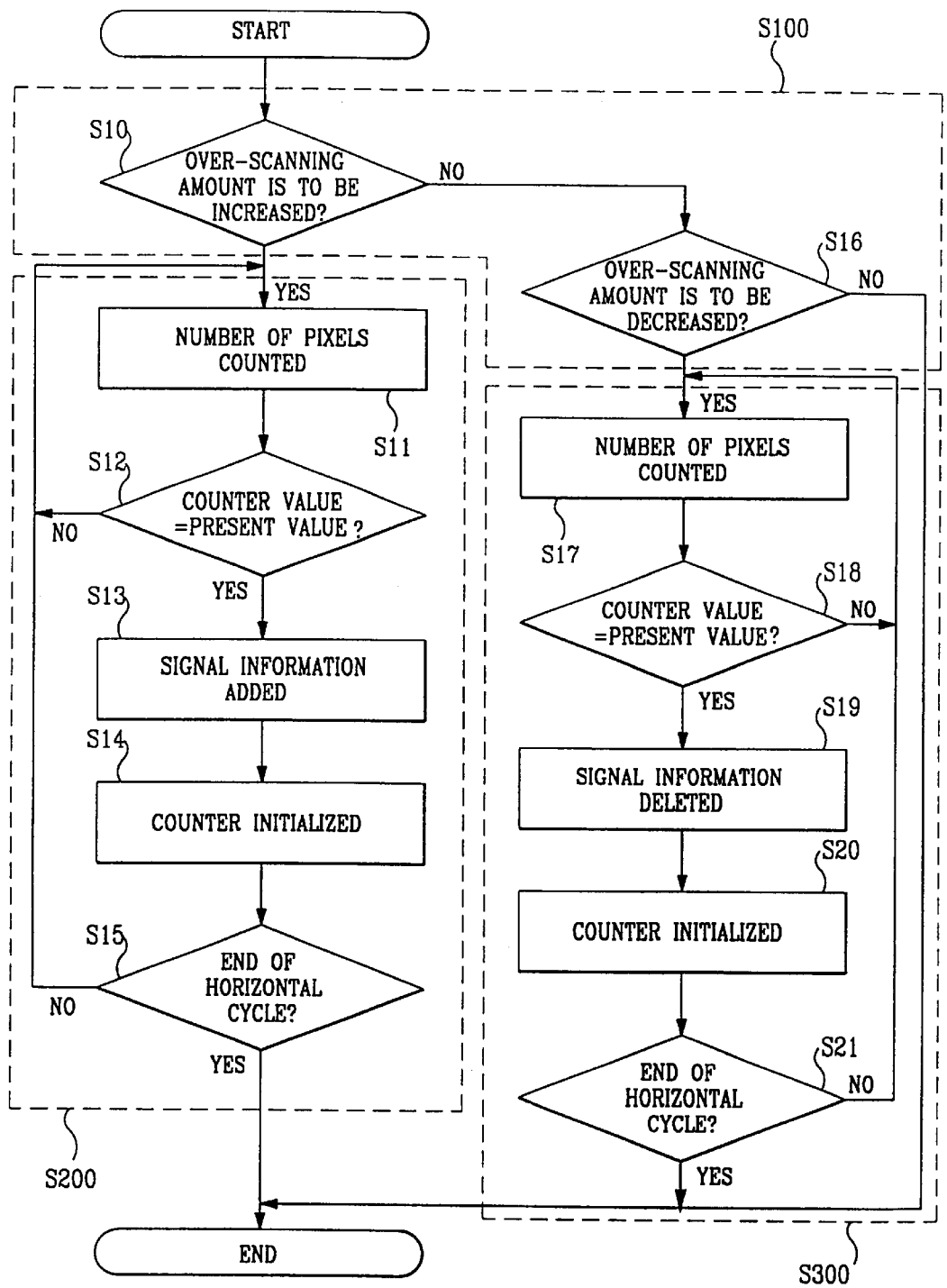
FIG. 4 is a flow chart showing the constitution of the method for adjusting the over-scanning amount according to the present invention.

FIG. 4 is a flow chart showing steps of the method for adjusting the over-scanning amount according to the present invention. Referring to this drawing, the method for adjusting an over-scanning amount according to the present invention includes the steps of: judging whether the over-scanning amount is to be increased or decreased (first step S100); periodically adding pixels of signal information if the over-scanning amount is to be increased (second step S200); and periodically deleting pixels of signal information if the over-scanning amount is to be decreased (third step S300).

The above method will be described in further detail. That is, the microcomputer 13 judges whether the over-scanning amount is to be increased (S10). If an increasing is to be carried out as judged at the step S10, the value of a counter for counting pixels is incremented (S11), and a judgment is made as to whether the current value of the counter is the set value (S12). The set value refers to the value which the microcomputer 13 has set in advance to indicate at which pixel position the signal information is to be inserted. (The signal information is inserted into the relevant pixel of each period consisting of a number of pixels.) If it is found that the value of the counter is not the set value at the step S12, the system returns to the step S11 to count the number of the pixels and to carry out the subsequent steps. If the value of the counter corresponds to the set value, then the signal information is added (S13).

Then the counter is cleared to the initial state to count the number of the pixels again (S14). Then a judgment is made as to whether it is the end of the horizontal cycle (S15).

If it is the end of the horizontal cycle, then the steps are terminated. If it is not the end of the horizontal cycle, the system returns to the step S11 to repeat the subsequent steps.

If it is found that the over-scanning amount is not to be increased, then a judgment is made whether the over-scanning amount is to be decreased (S16). If it is found that the over-scanning amount is not to be decreased at the step S16, then the executions of the steps are terminated. On the other hand, if the over-scanning is to be decreased, then the number of the pixels is counted to increment the value of the counter (S17).

Then the microcomputer 13 compares the value of the counter with a preset value to decide which pixel of the signal information is to be deleted (S18). (The signal information is deleted from a relevant pixel of each interval consisting of a number of pixels.) If the value of the counter is not the same as the preset value, the system returns to the step S17 to count the number of the pixels again. If the value of the counter is same as the preset value, then the signal information is deleted at the corresponding pixel (S19).

Thereafter, the counter is cleared to put the counter to the initial state (S20). Then a judgment is made as to whether it is the end of the horizontal cycle (S21). If it is the end of the horizontal cycle, the execution of the steps is terminated. If it is not the end of the horizontal cycle, the system returns to the step S17 to repeat the subsequent steps.

Figure 5:
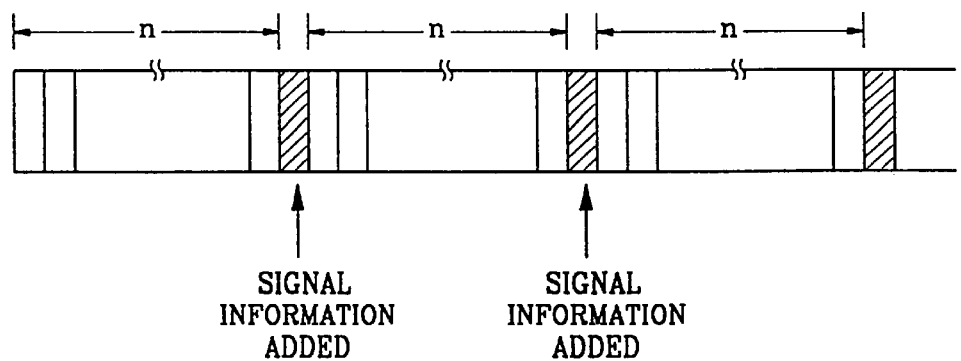
FIG. 5 illustrates the method for increasing the over-scanning amount by adding signal information according to the present invention.
Figure 6:
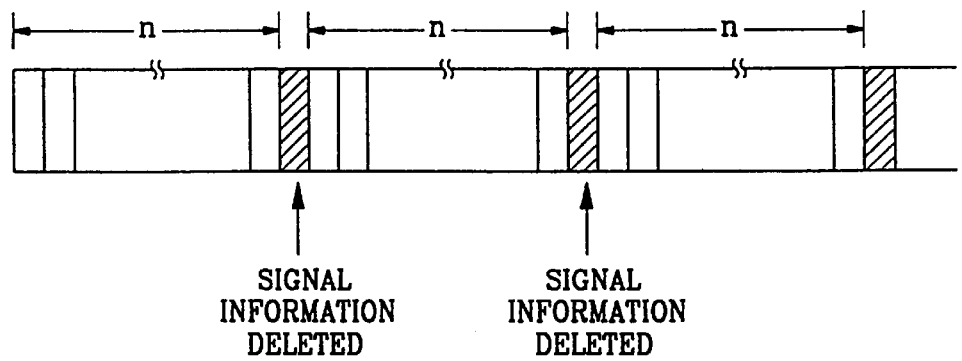
FIG. 6 illustrates the method for decreasing the over-scanning amount by deleting signal information according to the present invention.

FIG. 5 illustrates the method for increasing the over-scanning amount by adding signal information according to the present invention. FIG. 6 illustrates the method for decreasing the over-scanning amount by deleting signal information according to the present invention.

Referring to FIG. 5, if the over-scanning amount is to be increased, the microcomputer 13 sets spatio-periodical intervals n to indicate which pixel the signal information is to be inserted into (the signal information being inserted at every spatio-periodical interval). Then the over-scanning controller 12 adds the signal information into each spatio-periodical interval of the signal information of the memory 11.

The values of the spatio-periodical intervals are made to be diminished like n−1, n−2, n−3 and so on. Thus the signal information is added more and more frequently, so that the over-scanning amount would be more increased. On the other hand, the values of the spatio-periodical intervals are made to be increased, so that the signal information would be added less frequently, thereby making the over-scanning amount increase by smaller amounts.

Referring to FIG. 6, if the over-scanning amount is to be decreased, the microcomputer 13 sets spatio-periodical intervals n to indicate which pixel of signal information is to be removed from (the signal information being deleted at every spatio-periodical interval). Then the over-scanning controller 12 deletes the signal information from each spatio-periodical interval n of the signal information of the memory 11.

The values of the spatio-periodical intervals can made to be diminished like n−1, n−2, n−3 and so on. Thus the signal information is deleted more and more frequently, so that the over-scanning amount would be more decreased. On the other hand, the values of the spatio-periodical intervals n can be made to be increased, so that the signal information would be deleted less frequently, thereby making the over-scanning amount decrease by smaller amounts.

When the signal information is deleted to decrease the over-scanning amount, the deletion of the signal information has only to be executed at every interval of n pixels. When the signal information is added to increase the over-scanning amount, the contents of the signal information to be added have to be decided. These contents are illustrated in FIG. 7.

In deciding the contents of the signal information to be added, the left or right adjacent information (or both) is utilized.

Figure 7A:
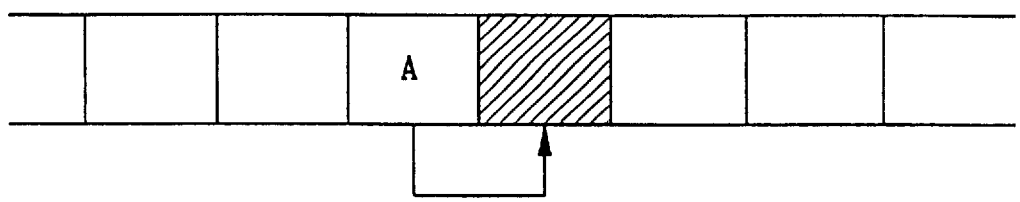
FIGS. 7a to 7c illustrate alternative ways for deriving the added signal information when adding the signal information in FIG. 5.
Figure 7B:
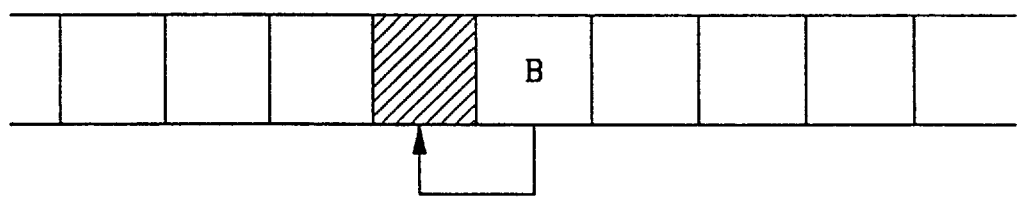

As shown in FIG. 7a, the signal information of the pixel at the left of the inserted pixel can be used as it is. Further, as shown in FIG. 7b, the signal information of the pixel at the right of the inserted pixel can be used as it is.

Figure 7C:
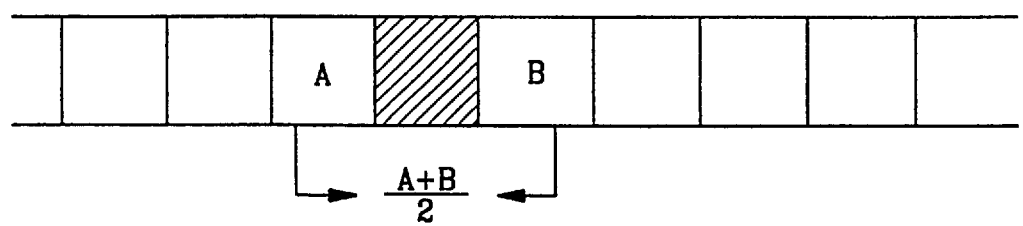

Further, as shown in FIG. 7c, an average value of the right pixel and left pixel information signal can be used. These methods are for protecting the picture from becoming unstable due to the variation of the contents of the signal information.

According to the present invention as described above, the signal information is inserted or deleted, so that the number of pixels of signal information can be adjusted, thereby adjusting the over-scanning amount. Consequently, the over-scanning amount can be adjusted in a natural manner to such an extent that the user cannot notice the adjustment of the size of the picture.

What is claimed is:

1. A method for adjusting an over-scanning amount, comprising the steps of:
   (a) judging whether the over-scanning amount is to be increased or decreased;
   (b) adding pixels of signal information if the over-scanning amount is to be increased; and
   (c) deleting pixels of signal information if the over-scanning amount is to be decreased;
   wherein step (b) comprises the substeps of:
      (b1) counting a number of pixels, and incrementing a value of a counter;
      (b2) judging whether the incremented value of the first substep corresponds to a preset values;
      (b3) adding a pixel of signal information if the value of the counter corresponds to the reset value in step (b2);
      (b4) initializing the value of the counters; and
      (b5) judging whether the end of a horizontal cycle has been reached.

2. The method as claimed in claim 1, wherein the preset value of substep (b2) corresponds to a value which has been set in advance to indicate a spatio-periodical interval at which the pixels of signal information are to be inserted;
   wherein if the value of the spatio-periodical interval is increased, the pixels of signal information are added less frequently, thereby making the amount of increase of over-scanning smaller; and
   wherein if the value of the spatio-periodical interval is decreased, the pixels of signal information are added more frequently, thereby making the amount of increase of over-scanning larger.

3. The method as claimed in claim 1, wherein in substep (b3), the signal information of the pixel to be added is selected from the group consisting of: signal information of the pixel adjacent to and to the left of the pixel to be added, signal information of the pixel adjacent to and to the right of the pixel to be added, and an average value of the signal information of the pixels adjacent to and to the left and right of the pixel to be added.

4. A method for adjusting an over-scanning amount, comprising the steps of:
   (a) judging whether the over-scanning amount is to be increased or decreased;
   (b) adding pixels of signal information if the over-scanning amount is to be increased; and
   (c) deleting pixels of signal information if the over-scanning amount is to be decreased;
   wherein step (c) comprises the substeps of:
      (c1) counting a number of pixels, and incrementing a value of a counter;
      (c2) judging whether the incremented value of substep (c1) corresponds to a preset value;
      (c3) deleting a signal information if the value of the counter in substep (c2) corresponds to the preset value;
      (c4) initializing the value of the counter; and
      (c5) judging as to whether the end of a horizontal cycle has been reached.

5. The method as claimed in claim 4, wherein the preset value of substep (c2) corresponds to a value which has been set in advance to indicate a spatio-periodical interal at which the pixels of signal information are to be deleted;
   wherein if the value of the spatio-periodical interval is increased, the pixels of signal information are deleted less frequently, thereby making the amount of decrease of over-scanning smaller; and
   wherein if the value of the spatio-periodical interval is decreased, the pixels of signal information are deleted more frequently, thereby making the amount of decrease of over-scanning larger.

* * * * *